United States Patent [19]

Stein et al.

[11] Patent Number: 5,365,461
[45] Date of Patent: Nov. 15, 1994

[54] POSITION SENSING COMPUTER INPUT DEVICE

[75] Inventors: Robert A. Stein, Bridgewater, Mass.;
James D. Logan, Windham, N.H.;
Charles A. Woringer, Catumet, Mass.

[73] Assignee: MicroTouch Systems, Inc., Wilmington, Mass.

[21] Appl. No.: 860,054

[22] Filed: Apr. 30, 1992

[51] Int. Cl.⁵ ............................................. G01B 7/00
[52] U.S. Cl. ................................................ 364/550
[58] Field of Search ........................ 364/550; 178/19

[56] References Cited

U.S. PATENT DOCUMENTS

| | | | |
|---|---|---|---|
| 4,659,874 | 4/1987 | Landmeier | 178/19 |
| 4,680,429 | 7/1987 | Murdock et al. | 178/19 |
| 4,686,332 | 8/1987 | Greanias et al. | 178/19 |
| 4,788,384 | 11/1988 | Bruere-Dauson et al. | 178/19 |
| 4,795,858 | 1/1989 | Yamazaki | 178/19 |
| 4,806,708 | 2/1989 | Yahagi | 178/19 |
| 4,848,496 | 7/1989 | Murakami et al. | 178/19 |

Primary Examiner—Jack B. Harvey
Assistant Examiner—Thomas Peeso
Attorney, Agent, or Firm—Kirk Teska; Joseph S. Iandiorio

[57] ABSTRACT

A position sensing computer input device including a sensor with a sensing surface including a conductive sheet on which a human touch and the touch of an inanimate object may both be sensed. The device is able to discriminate between the two types of touch for allowing input with at least one of an inanimate object and a human touch.

31 Claims, 3 Drawing Sheets

POSITION SENSING COMPUTER INPUT DEVICE

FIELD OF INVENTION

This invention relates to a position sensing computer input device which is responsive to both human and stylus touch and which discriminates between the two types of touch for allowing input in either manner with a single sensor device.

BACKGROUND OF INVENTION

There are many types of touch sensitive computer input devices currently used for the purpose of digitizing touch on or in conjunction with computer displays. Such devices measure the position of a stylus or finger touch on the sensor surface. The position is used to generate coordinates for the purpose of interacting with the computer, for example in pointing to icons on the display, picking menu items, editing computer generated images, and feedback for input of hand-drawn characters and graphics.

Such devices which sense a human touch may sense using any number of technologies, including capacitive sensing, resistive sensing using a conductive overlay sheet, infrared sensing, acoustic wave sensing, and piezoelectric force sensing. Digitizers which use corded hand held styli such as pens or pucks typically use electromagnetic sensing, electrostatic sensing, resistive sensing, or sonic pulse sensing.

Devices responsive to human touch are typically used for cursor control application, for example pointing to display icons and picking menu items. Devices that are responsive to styli (usually a corded pen) are used to create or trace drawings, blueprints, or original art. These devices are also used for character or handwriting recognition. It is desirable that the device have a pen and paper feel so that it's use is intuitive to most users. It is therefore desirable that the sensor reproduce the trace of the pen below the stylus by some visual means so that the user has visual feedback.

Some of these devices are responsive to both human touch and stylus touch, thereby providing the convenience of stylus-based input, for example when writing on the screen, as well as the ease of human touch input, which does not require the user to find the stylus and pick it up to use it. However, because these sensors cannot distinguish between human and stylus touch, the user may not touch the screen while using the stylus, or vice versa. Accordingly, in the use of these sensors the operator must take great care, which detracts from their desirability.

Some such devices are used as computer input tablets which, rather than being placed on the face of a display, are placed on the desk top next to the computer, similar to a mouse. Such sensor devices are commonly employed for handwriting recognition, in which they are used as a writing tablet. However, when using such tablets, the operator must painstakingly avoid touching the screen with his finger or hand while writing with the stylus. Accordingly, these devices are rather awkward to use.

One system that has the capability of sensing both stylus and human touch is disclosed in U.S. Pat. No. 4,686,332 (Greanias et al., Aug. 11, 1987). The device uses an X-Y array of discrete conductors in spaced planes to electrostatically detect the position of the stylus; finger touch position is determined by detection of a change in capacitance of the conductors closest to the finger. The two large arrays of closely spaced conductors required for good resolution, however, is difficult to fabricate, requiring etching of two layers of conductive material into parallel conductor patterns, and then careful placement of the layers one over the other to accomplish the spaced X-Y conductor array. Having two layers of conductors over the display also interferes significantly with light transmittance, making the device uncomfortable to use. In addition, each conductor or pair of conductors requires discrete electronic components to make the capacitance measurements, making the device complex and costly. Finally, the requirement of driving the conductors individually results in relatively slow digitization response, unless expensive high-speed drive and sensing circuitry is used.

SUMMARY OF INVENTION

It is therefore an object of this invention to provide a position sensing input device which discriminates between a human and inanimate object touch.

It is a further object of this invention to provide such a device which allows the user to place his hand on the input tablet while writing thereon with a stylus.

It is a further object of this invention to provide such a device which allows the display of the stylus trace on the input device.

It is a further object of this invention to provide such a device in which the sensor is virtually transparent.

It is a further object of this invention to provide such a device with relatively simple and inexpensive circuitry.

It is a further object of this invention to provide such a device that has fast response.

It is a further object of this invention to provide such a device that can digitize up to 200 touch points per second.

It is a further object of this invention to provide such a device that does not require discrete drive and sense components for pairs of conductors.

It is a further object of this invention that it provide a pen and paper feel.

This invention results from the realization that a simple to use, intuitive computer input device may be accomplished by sensing both human and inanimate-object touch, and discriminating between the two, so that the user does not have to meticulously avoid touching the screen when using a stylus, or vice versa.

This invention features a position sensing input device which includes a sensor with a sensing surface that includes a conductive sheet, means for detecting both a human touch and the touch of an inanimate object on the surface, and means for discriminating between the two types of touch to allow input with at least one of an inanimate object and a human touch.

The means for detecting a human touch may include means for supplying current, preferably time-varying, to the conductive surface coating, and may further include means for determining the current flow to the conductive surface responsive to the touch. The detected current may be out of phase with the supply voltage. The input device may further include means for determining the human touch location on the surface and means for determining the inanimate touch location on the surface. In one embodiment, the inanimate object is conductive and may be a corded stylus. In that case, the touch of the conductive object may be detected by supplying a current to the object and determining the current flow through the object into the conductive coating and in phase with the supply voltage responsive to the touch on the sensor surface.

In one embodiment, the device discriminates between a human and inanimate object touch by alternately enabling the means for detecting a human touch and means for detecting an inanimate object touch; this may be accomplished with a switch either under control of the operator or the system. The operator controlled switch may be a manual switch mounted on the stylus, a stylus attitude-indicating switch, a finger-sensing switch on the stylus, or a stylus-sensing switch in a stylus holder, for example. Preferably, the touch of the inanimate object is enabled when that touch is concurrent with a human touch to establish touch priority to the inanimate object touch.

BRIEF DESCRIPTION OF DRAWINGS

Other objects, features and advantages will occur to those skilled in the art from the following description of a preferred embodiment and the accompanying drawings, in which.

DISCLOSURE OF PREFERRED EMBODIMENT

This invention may be accomplished in a position sensing input device which includes a sensor having a resistive sheet sensing surface on which may be detected a human touch and the touch of an inanimate object. The device then is able to discriminate between the two types of touch to allow input with at least one of an inanimate object and a human touch.

Figure 1:
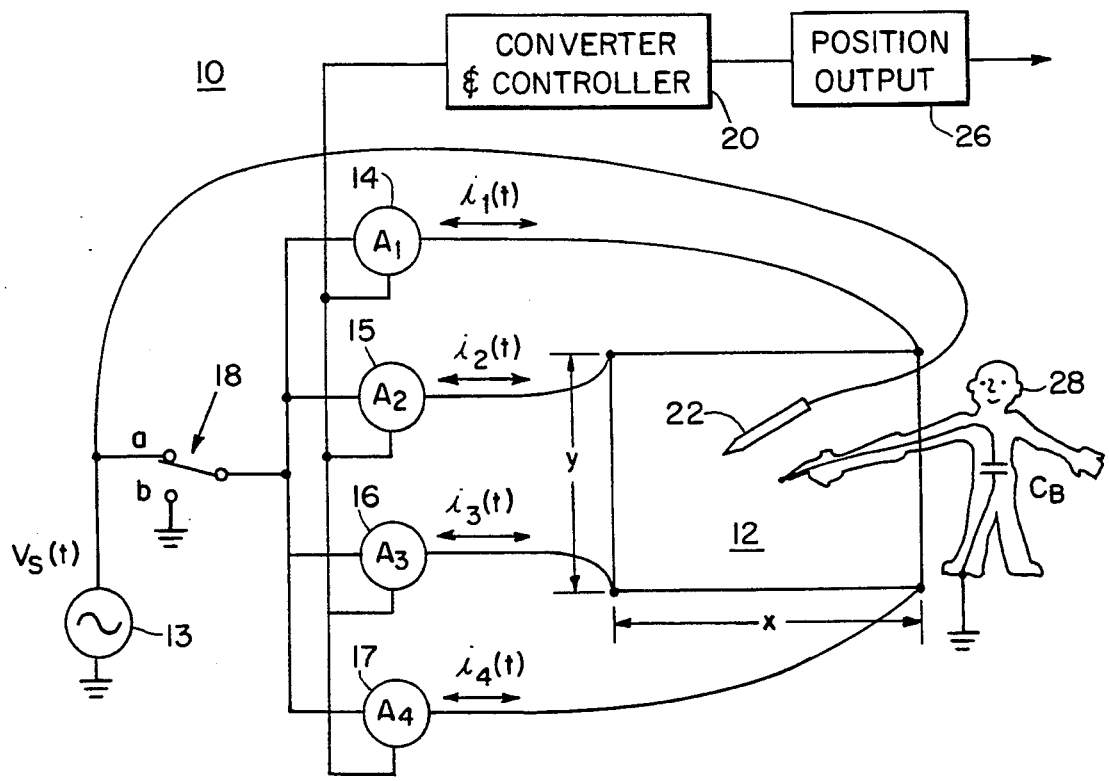
FIG. 1 is a simplified schematic diagram of a position sensing input device according to this invention.

There is shown in FIG. 1 position sensing input device 10 according to this invention. Device 10 includes sensor 12 made of a glass substrate, typically in the shape of the display device over which it fits, to which is applied over the front surface a continuous or discontinuous conductive coating; the discontinuous coating may take the form of an etched "waffle pattern" as is known to those skilled in the art. The conductive sheet may be protected from scratching with a thin protective coating that still provides for electrical "touching" of the conductive coating. Around the perimeter of sensor 12 is an electrode pattern for conducting current to and from the conductive coating of sensor 12 through the four sensor corners. The construction of the sensor, including the conductive coating and the electrode pattern for the coating, is known to those skilled in the art, as established for example in U.S. Pat. Nos. 4,071,691, 4,129,747, 4,198,539, 4,293,734, 4,302,011, and 4,371,746, all by Pepper, Jr., and incorporated herein by reference. Each of the four corners of the electrode pattern has leading from it a wire connected to one of four phase-sensitive current devices 14 through 17 in series with the four corner wires. Time varying voltage source 13 is alternately applied to the surface of sensor 12 and to stylus 22 through switch 18 as described below.

Figure 2A:
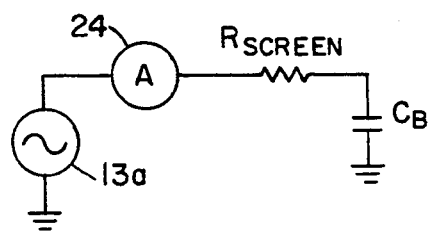
FIGS. 2A and 2B are equivalent circuits for touch and stylus sensing, respectively.

For sensing the position of a human touch operation is as follows. Time varying voltage source 13 applies a voltage to the surface of sensor 12 through switch 18 being in position "a". When person 28 touches the screen, a small amount of current is conducted to ground via the equivalent capacitance $C_B$. Current detectors 14 through 17, under control of controller 20, are enabled to detect the current flow to each of the four corners of sensor 12, 90° leading the phase of voltage source 13. The equivalent circuit for such touch sensing is shown in FIG. 2A, described below.

Figure 2B:
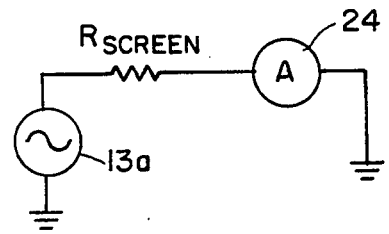

For sensing the position of a stylus on the surface of sensor 12, the operation is as follows. Time varying voltage source 13 applies a voltage to stylus 22. Switch 18 is set in position "b" and current detectors 14 through 17 are enabled by controller 20 to detect current flowing out of the four corners of sensor 12, through the current detectors, to ground. The detection is in phase with voltage source 13. The equivalent circuit is shown in FIG. 2B, described below.

Converter and controller 20 receives as its input the current values sensed by each of the four phase sensitive current detectors 14 through 17, labelled $i_1$ through $i_4$. Circuit 20 then employs the following algorithm to compute the X and Y position of the touch or stylus on the surface of sensor 12:

$$x = \frac{(i_1 + i_4) - (i_2 + i_3)}{i_1 + i_2 + i_3 + i_4}$$

$$y = \frac{(i_1 + i_2) - (i_3 + i_4)}{i_1 + i_2 + i_3 + i_4}$$

Device 10 is thus able to sense the touch of an inanimate object as well as a human touch; the device discriminates between those two types of touch as follows. First, controller 20 may be enabled to convey to output 26 information relating to the state of switch 18, which indicates whether the touch or stylus sensing is enabled. Then, when a touch point is found, the type of touch is known. Preferably, the device prioritizes stylus sensing over human touch sensing so that the operator may rest his hand on the sensor while using the stylus as the input device, as commonly occurs in handwriting or character recognition.

Alternatively, the system may output virtually simultaneously for both the stylus and touch by rapidly operating switch 18 at approximately 200 times per second, which is sufficient for most digitization applications, including handwriting recognition. For handwriting recognition, however, it is preferable to sense only the stylus.

The above description contemplates employing capacitive sensing technology in digitizing the stylus and finger touch location. However, this is not a limitation of the invention as any of the appropriate digitization technologies may be employed. For example, sensor 12 could employ capacitive type sensing for sensing the human touch and resistive sensing for the stylus with appropriate sensor and signal drive configurations. As an example, a human touch sensor using any available technology, for example surface acoustic wave, light beam, or capacitive sensing, could be physically laid over an electromagnetic digitizer tablet to form a finger/stylus sensing assembly. As long as the two layers were carefully aligned to maintain touch-point digitization accuracy, such a combined assembly would be practical.

An alternative sensor arrangement could employ discrete portions of sensor conductor for providing touch sensitivity in only selected portions of the device. Such an arrangement would be preferred for a touch-sensitive keyboard or keypad arrangement.

FIG. 2A illustrates the circuit equivalent to that of FIG. 1 for sensing a human touch; the current sensed by detector 24 is 90° leading of the voltage source 13a. The equivalent circuit for stylus sensing is shown in FIG. 2B. In this mode, the sensed current is in phase with the voltage source.

Figure 3:
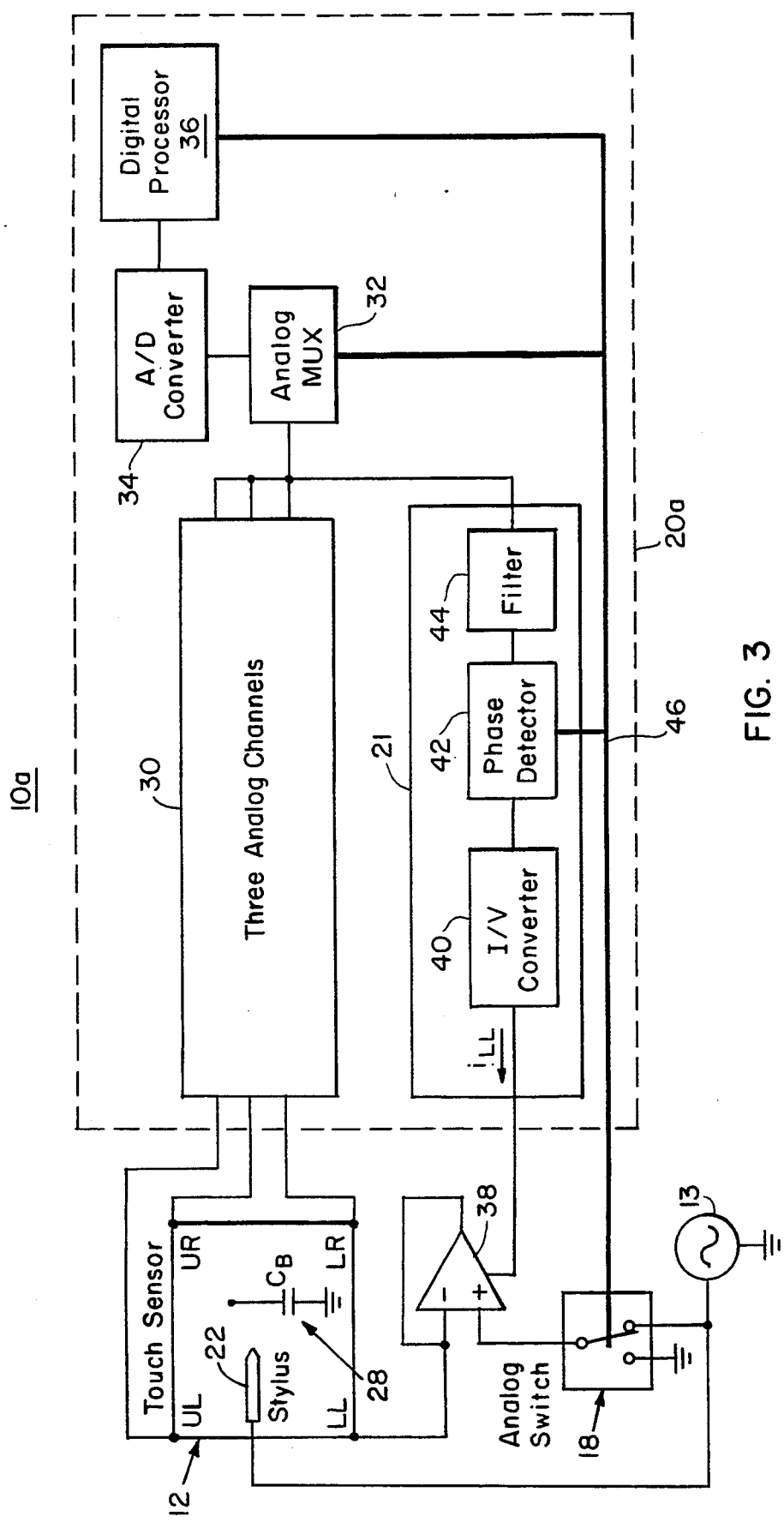
FIG. 3 is a more detailed schematic diagram of the device of FIG. 1.

FIG. 3 shows in greater detail an embodiment of device 10a in which buffer 38 is employed as a source of current to the lower left (LL) corner of sensor 12 for sensing human touch (touch mode), and as a current sink from the same sensor corner when operating to detect a stylus (stylus mode). In touch mode, switch 18 is in the position shown, and buffer 38 acts as a current source for supplying current to the lower left corner of sensor 12. When sensor 12 is touched, current is conducted to ground at the point of touch. Component 30 would include three parallel duplicates of converter circuit 21 and buffer 38 to supply the same signal to all four corners for capacitive-type sensing of a finger touch; only one circuit 21 is shown for clarity. Converter and controller 20a includes lower left converter circuit 21 comprising current to voltage converter 40, which determines the current flow to the lower left corner. Phase detector 42 allows the processor 36 to sample the input signal at various phase angles as appropriate. Analog filter 44 enables A/D converter 34 to sample a stable signal. Analog multiplexer 32 enables processor 36 to switch between the four input channels so that it may determine the touch location from the current flow into each of the four corners of sensor 12.

In the stylus mode, switch 18 is moved by digital processor 36 to ground, and the current is supplied to stylus 22. Buffer 38 then acts as a current sink for allowing the measurement of in-phase current flow from the stylus to each of the four corners of sensor 12 before digitizing the stylus touch location.

Under control of processor 36, the device may be enabled to sense only human touch, only stylus touch, or both at virtually the same time by operating switch 18 at up to 200 cycles per second. By switching rapidly between the two types of sensing modes, the touch and stylus can both be detected. Preferably, only one position is digitized and outputted to enable a very fast report rate to allow accurate and timely computer input using the sensor. If both a touch and stylus are in contact with sensor 12 at the same time, processor 36 preferably reads only the stylus position to enable the user to rest his hand on the sensor while writing with the stylus.

Figure 4:
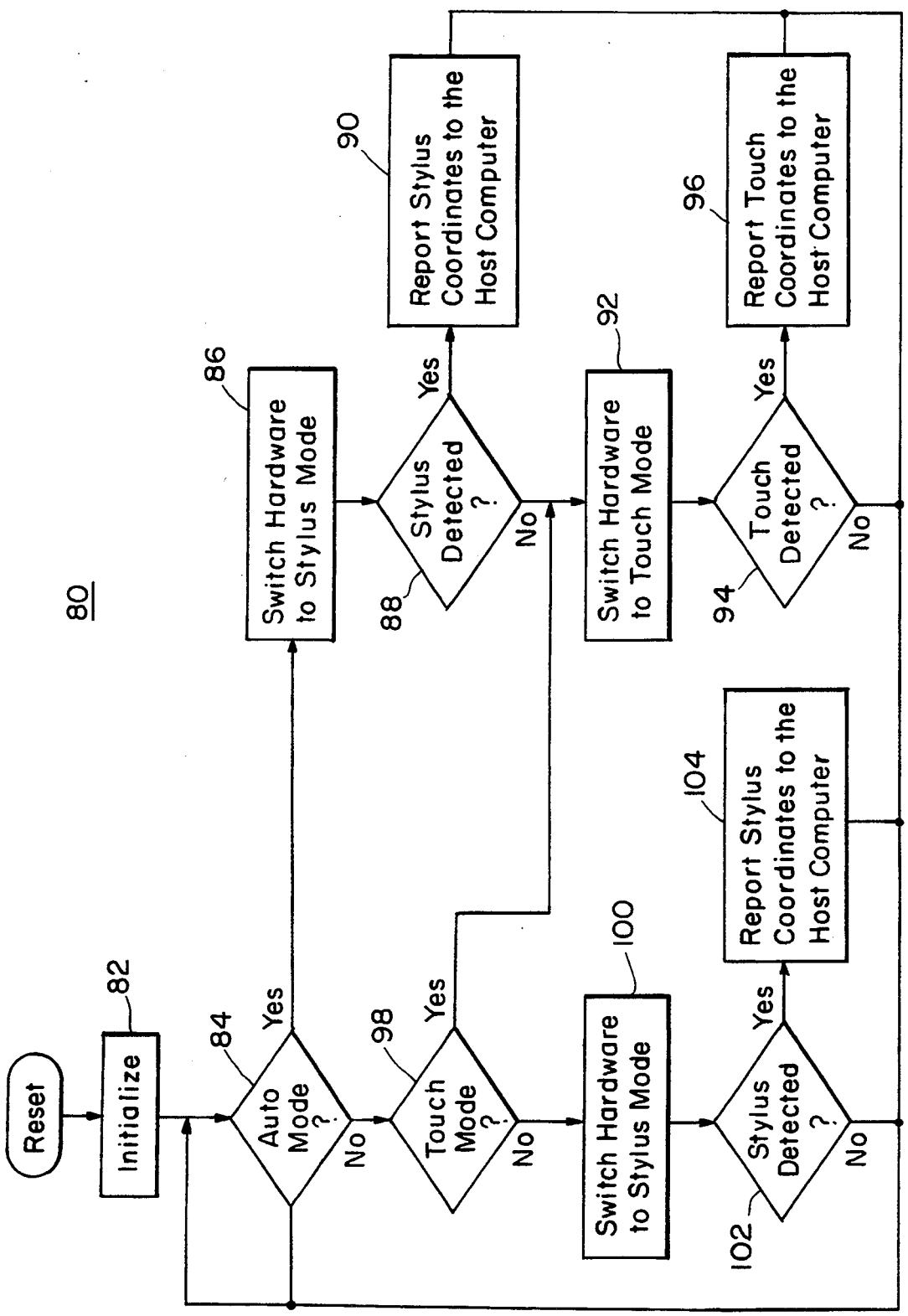
FIG. 4 is a flow chart of the software algorithm for the sensor of FIG. 1.

FIG. 4 details flow chart 80 of the software algorithm for operating the device in either the stylus, touch, or automatic mode, in which both the stylus and human touch can be used for input. After initialization, step 82, and if the automatic mode is chosen either by the operator or by the system (for example as a default), step 84, the hardware is switched to stylus mode first, step 86, and if a stylus touch is detected, step 88, the system reports the stylus coordinates to the host computer, step 90, for use as desired. Operation would then return to step 84. If a stylus touch is not detected, the hardware switches to touch mode, step 92, and if a touch is detected, step 94, the system reports the touch coordinates to the host computer, step 96, and operation returns to step 84. If a touch was not detected, operation returns to step 84. Alternatively, to sense both stylus and finger touching at virtually the same time, operation after step 90 could proceed to step 92. This would allow the user to use both the stylus and a finger to operate the computer, for example to allow the user to select a menu item with a finger while writing, without the need to lift the stylus from the sensor surface.

If auto mode is not chosen and touch mode is chosen, step 98, operation proceeds to step 92 for detection of a touch. If the touch mode was not chosen the hardware switches to stylus mode, step 100, and when the stylus is detected, step 102, the stylus coordinates are reported to the host computer, step 104, and operation returns to step 84.

Many persons using the device in a computer handwriting tablet will tend to rest their hand on the sensor surface as they use the stylus to write. Since the hand contact interferes with signal transmission from the stylus, through the sensor conductive coating, and into the edge electrodes, touching the sensor while using the stylus will cause the computer to resolve a stylus touch point that is somewhere between the stylus tip and the hand contact area, thereby decreasing the digitization accuracy.

To overcome this loss of accuracy, the device of this invention may be enabled to use the perceived stylus position in conjunction with the resolved hand position determined with the stylus signal off (touch mode), to calculate the true stylus position. In effect, the true hand position is subtracted from the perceived stylus position (stylus plus hand position) to resolve the true stylus position.

The following software algorithm can be used to correct inaccuracies due to sensor/display misalignment, rescale the active sensor area to the display area, or correct offset errors in the sensor/analog hardware. The algorithm can be executed separately for touch or pen mode to eliminate accuracy differences between the two modes. The user is required to touch the lower left and upper right display to "rescale" the reported coordinates to these points.

$X_{corrected} = N_x(X - X_{11})/(X_{ur} - X_{11})$
$Y_{corrected} = N_y(Y - Y_{11})/(Y_{ur} - Y_{11})$ Where:
X,Y = Calculated via algorithm set forth above.
$N_x, N_y$ = X and Y Axis resolution.
$X_{11}, Y_{11}$ = Coordinates reported at lower left touch.
$X_{ur}, Y_{ur}$ = Coordinates reported at upper right touch.

The software could also enable the system to designate selected screen portions to detect only touch, or only the stylus. This could be accomplished by reporting touch digitization points only in areas designated for touch sensing, and doing the same for stylus sensing. This feature would be especially useful as a simple means of rejecting touch in an area (potentially the entire screen) designated for handwriting input using the stylus, in order to allow the user's hand to rest on the sensor surface while writing.

Figure 5A:
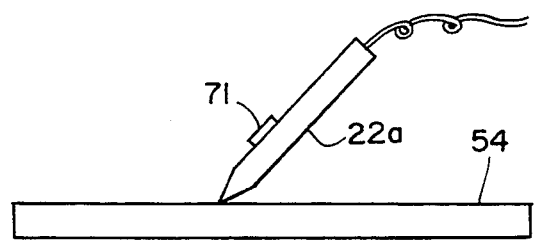
FIG. 5A is a side view of a sensor construction of the device of this invention showing a manual switch for switching between stylus touch-based sensing.
Figure 5B:
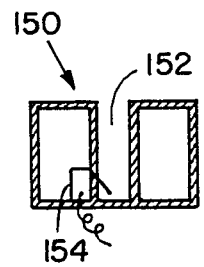
FIG. 5B is a cross sectional view of a stylus holder used for stylus storing according to this invention and FIG. 5C is a partly cross-sectional view of an alternative sensor construction showing additional switching schemes.

FIGS. 5A and 5B illustrate two alternate embodiments for accomplishing switching between stylus and finger sensing. Manual switch 71 FIG. 5A, which may be a slide switch, may be mounted on stylus 22 for manual operation by the user. Switch 22 would in this embodiment replace machine-controlled switch 18, FIG. 1, to provide user selection of sensing mode. Alternatively, stylus holder 150, FIG. 5B may be used for stylus storage, in receiving slot 152, and microswitch 154 or another stylus-sensing means such as a light beam may be employed within slot 152 to detect the presence of stylus 22a in holder 150, interpreted by the system as a user selection of touch mode sensing.

Figure 5C:
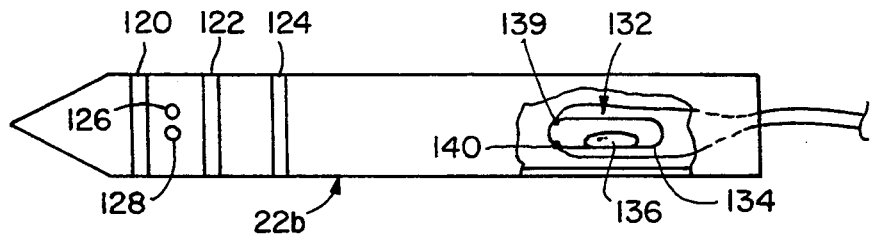

Alternative means of providing for switching between stylus and touch modes are shown in FIG. 5C. Stylus-mounted external finger sensors such as capacitive-sensing metal bands 120, 122, and 124 may be used to detect when the stylus is being held near the tip to automatically switch to the stylus sensing mode. Alternatively, spaced resistive contacts 126 and 128, shortened by a user's finger, may be used for the same purpose. Lastly, position-sensitive switch 132 may be used to detect the relative attitude of stylus 22b; when the stylus is vertical or close to vertical, operation is switched to stylus mode, and when the stylus is horizontal or close to it, operation is switched to touch mode. Switch 132 may be a mercury switch in which contacts 139 and 140 are mounted close to one end of vial 134 containing mercury 136 so that mercury 136 creates a conductive path between the contacts when the stylus is held near vertical. Switching may also be provided by software under user control, for example by use of keystrokes on the computer keyboard.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A position sensing input device, comprising:
a sensor having on analog sensing surface and including a single layer of one or more conductive sheets;
means for detecting without electromagnetic radiation either a human touch or the touch of an inanimate object or both on said sensor; and
means for discriminating between the two types of touch for allowing input with at least one of an inanimate object and a human touch.

2. The input device of claim 1 in which said sensor includes an insulative substrate with a single conductive surface coating.

3. The input device of claim 1 in which said means for detecting a human touch includes means for supplying current to each said conductive sheet.

4. The input device of claim 3 in which said means for detecting a human touch further includes means for determining the current flow to each said conductive sheet responsive to the human touch.

5. The input device of claim 3 in which said current is time-varying.

6. The input device of claim 2 in which said inanimate object is conductive.

7. The input device of claim 6 in which said means for detecting an inanimate object touch includes means for supplying a current to said inanimate object.

8. The input device of claim 7 in which said means for detecting an inanimate object touch further includes means for determining the current flow through said inanimate object into said conductive surface coating responsive to the inanimate object touch on said sensing sensor surface.

9. The input device of claim 1 in which said means for discriminating includes means for alternately enabling said means for detecting a human touch and said means for detecting an inanimate object touch.

10. The input device of claim 1 in which said means for discriminating includes means for detecting the inanimate object touch when that touch is concurrent with a human touch to establish touch priority to the inanimate object touch.

11. The input device of claim 1 further including means for determining the inanimate touch location on said surface.

12. The input device of claim 9 in which said means for alternately enabling includes a switch.

13. The input device of claim 12 in which said switch is mounted on the inanimate object for operator control.

14. The input device of claim 9 in which said means for alternately enabling includes means for resolving human touch on the inanimate object.

15. The input device of claim 14 in which said means for resolving includes one or more capacitive sensors.

16. The input device of claim 14 in which said means for resolving includes a pair of resistive contacts.

17. The input device of claim 9 in which said means for alternately enabling includes means for determining the relative attitude of said inanimate object.

18. The input device of claim 17 in which said means for determining the relative attitude includes a tilt-sensitive switch for said inanimate object.

19. The input device of claim 9 in which said means for alternately enabling includes a sensor in an inanimate-object holding device.

20. The input device of claim 1 further including means for determining the human touch location on said surface.

21. The input device of claim 5 in which said means for determining the current flow includes means for detecting current out of phase with the voltage.

22. The input device of claim 8 in which said means for determining the current flow includes means for detecting current in phase with the voltage.

23. The input device of claim 1 in which said means for detecting includes a phase-sensitive detector.

24. The input device of claim 1 further including means for allowing human or inanimate object touch selection of discrete portions of said sensor for providing preestablished touch-sensitive areas.

25. The input device of claim 1 in which said means for detecting includes separate human touch and inanimate object touch sensors aligned to accurately report touch prints.

26. The input device of claim 1 further including means for calibrating touch position of both a human touch and an inanimate-object touch.

27. A position sensing input device, comprising:
an insulative substrate with a single conductive surface coating;
means for supplying time-varying current to said surface coating;
means for resolving current flow to said surface coating out of phase with the supply voltage responsive to a human touch on said surface coating for detecting the human touch;
a conductive stylus;
means for supplying time-varying current to said stylus;

means for resolving current flow from said stylus to said surface coating in phase with the supply voltage responsive to stylus touch on said surface coating for detecting the stylus touch; and means for discriminating between the human and stylus touch for allowing input with at least one of said stylus and a human touch.

28. The input device of claim 27 in which said means for supplying time-varying current to said surface coating and said means for resolving current flow from said stylus to said surface coating includes a current buffer.

29. A position sensing input device, comprising:

an insulative substrate with a single conductive surface coating;

means for supplying time-varying current to said surface coating;

means for resolving current flow to said surface coating out of phase with the supply voltage responsive to a human touch on said surface coating for detecting the human touch;

a conductive stylus;

means for supplying time-varying current to said stylus;

means for resolving current flow from said stylus to said surface coating in phase with the supply voltage responsive to stylus touch on said surface coating for detecting the stylus touch; and means for alternately enabling said means for resolving current flow to said surface coating responsive to a human touch and said means for resolving current flow from said stylus to said surface coating for discriminating between the two types of touch.

30. The input device of claim 29 in which said means for alternately enabling includes means for detecting stylus touch when that touch is concurrent with human touch to establish touch priority to the stylus touch.

31. A position sensing input device, comprising:

a sensor having an analog sensing surface;

an input stylus;

means for detecting without electromagnetic radiation either a human touch or a stylus touch or both on said sensor;

means for determining when the stylus is being used; and means, responsive to said means for determining, for reporting only stylus touch points when said stylus is being used, to allow the user to physically touch the sensing surface while using the stylus.

* * * * *